United States Patent
Robustelli et al.

(10) Patent No.: US 9,094,495 B1
(45) Date of Patent: Jul. 28, 2015

(54) SYSTEM AND METHOD FOR ENERGY MANAGEMENT WITHIN A GROUP OF DEVICES

(71) Applicant: SYMBOL TECHNOLOGIES, INC., Schaumburg, IL (US)

(72) Inventors: Michael E Robustelli, Kings Park, NY (US); Kenneth J Rivalsi, Lake Grove, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/257,035

(22) Filed: Apr. 21, 2014

(51) Int. Cl.
*H04M 1/00* (2006.01)
*H04M 1/04* (2006.01)
*H02J 7/00* (2006.01)

(52) U.S. Cl.
CPC .............. *H04M 1/04* (2013.01); *H02J 7/0044* (2013.01)

(58) Field of Classification Search
CPC .......... H04M 1/72519; H04M 1/0214; H04M 1/72561; H04M 1/72527; H04M 19/08; H04M 1/04; H04M 1/0262; G06F 1/1632; G06F 1/1626; H04B 1/3883; H04B 1/52; H04B 1/3887; H04B 1/1615; H02J 7/0044; Y02E 60/12; H04W 52/02; H04W 52/028; H04W 52/0229
USPC ......... 455/426.1, 426.2, 462, 425, 90.1–90.3, 455/569.1, 414.1, 418–420, 550.1, 556.2, 455/571, 572, 573, 574, 67.11, 575.1; 379/401, 413, 404, 412; 713/320, 321, 713/330, 340; 361/686, 724–727, 93.1
See application file for complete search history.

(56) References Cited

U.S. PATENT DOCUMENTS

| | | | |
|---|---|---|---|
| 7,027,808 B2 | 4/2006 | Wesby | |
| 7,086,081 B2 * | 8/2006 | Martinez et al. | 725/133 |
| 7,151,769 B2 * | 12/2006 | Stanforth et al. | 370/351 |

(Continued)

FOREIGN PATENT DOCUMENTS

| | | |
|---|---|---|
| WO | 2006034563 A1 | 4/2006 |
| WO | 2012027844 A1 | 3/2012 |

OTHER PUBLICATIONS

Gruenwald et al., "A Power-Aware Technique to Manage Real-Time Database Transactions in Mobile Ad-Hoc Networks", Database and Expert Systems Applications, 2001, Proceedings 12th International Workshop on Sep. 3, 2001-Sep. 7, 2001, pp. 570-574.

(Continued)

*Primary Examiner* — Babar Sarwar

(57) ABSTRACT

Each charging member in a group identifies a docking connection. Each charging member, responsive to identifying the docking connection, transmits information to other charging members in the group and receives information transmitted from another charging member in the group. Each charging member generates a list using the information transmitted to the group and received from the group. Each charging member also includes a ranking component for filtering, sorting, and ranking entries in the list according to a predefined selection filter and/or ranking filter. Each entry in the list is associated with a charging member with a docking connection and in the group. Each charging member determines based on a predefined indication filter that an entry in the list that is associated with the charging member is ranked at a predefined position in the list and provides an indication.

19 Claims, 4 Drawing Sheets

(56) References Cited

U.S. PATENT DOCUMENTS

| | | | |
|---|---|---|---|
| 7,697,963 B1* | 4/2010 | Pomery | 455/572 |
| 7,720,026 B2 | 5/2010 | Chen et al. | |
| 8,072,392 B2* | 12/2011 | Lection | 345/1.1 |
| 8,188,709 B2* | 5/2012 | Onishi et al. | 320/108 |
| 8,314,699 B2* | 11/2012 | Irmscher et al. | 340/568.8 |
| 8,320,302 B2 | 11/2012 | Richeson | |
| 8,510,737 B2 | 8/2013 | Kunjithapatham et al. | |
| 8,553,408 B2* | 10/2013 | Supran et al. | 361/679.41 |
| 8,558,694 B2 | 10/2013 | Brandt et al. | |
| 9,026,710 B2* | 5/2015 | Goodman et al. | 710/303 |
| 2006/0067249 A1* | 3/2006 | Poustchi et al. | 370/260 |
| 2009/0261656 A1* | 10/2009 | Coonan et al. | 307/80 |
| 2012/0115503 A1 | 5/2012 | Lynch et al. | |
| 2012/0136942 A1 | 5/2012 | Amidon et al. | |
| 2012/0153892 A1* | 6/2012 | Makhija et al. | 320/107 |
| 2013/0002455 A1 | 1/2013 | Koehrsen et al. | |
| 2013/0173765 A1 | 7/2013 | Korbecki | |
| 2013/0185373 A1 | 7/2013 | Vandwalle et al. | |
| 2015/0011160 A1* | 1/2015 | Jurgovan et al. | 455/41.1 |
| 2015/0056920 A1* | 2/2015 | Huttunen et al. | 455/41.2 |

OTHER PUBLICATIONS

Choi et al., "Group based Resource Selection Algorithm supporting Fault-tolerance in Mobile Grid", Semantics Knowledge and Grid, Third International Conference on Oct. 29-31, 2007, pp. 426-429.

* cited by examiner

SYSTEM AND METHOD FOR ENERGY MANAGEMENT WITHIN A GROUP OF DEVICES

BACKGROUND OF THE INVENTION

A group of devices may have their batteries charged on one charging device or on individual charging devices within a given location, such as a retail store or a warehouse. While devices in the group are being charged and/or subsequent to devices in the group being charged, each device in the group may provide an indication of its state of charge (i.e., a current percentage of the charge left on a battery being used to power the device). For example, each device in the group that is being charged may include a light emitting diode (LED) that displays a blinking pattern (for example, a blinking green light) and each device in the group that is fully charged may display, for example, a solid green light on its LED. If one or more charged devices is situated among a group of devices that are being charged, the LED pattern from the charged device(s) may be difficult to see amidst the blinking green lights emitted by those devices that are being charged. In addition to indicating the charge state, there may be a need to provide an indication of a specific characteristic associated with one or more devices in the group. For example, there may be a need to provide an indication by one or more devices in the group with the best state of health (i.e., the best current the condition of the battery being used in the device as compared to the battery's ideal condition), the least used battery, and/or the newest battery. In another example, there may be a need to provide an indication by one or more devices in the group with a certain feature, for example, a radio frequency identifier (RFID) reader.

To provide indications of a specific characteristic and/or feature, each device in the group may send its status information to a server and receive information from the server, via, for example, a wireless connection between the device and the server. Such a setup requires a complicated and expensive infrastructure (i.e., the server hardware, software for the server and a device license for each device).

Accordingly, there is a need for a system and method for energy management within a group of devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
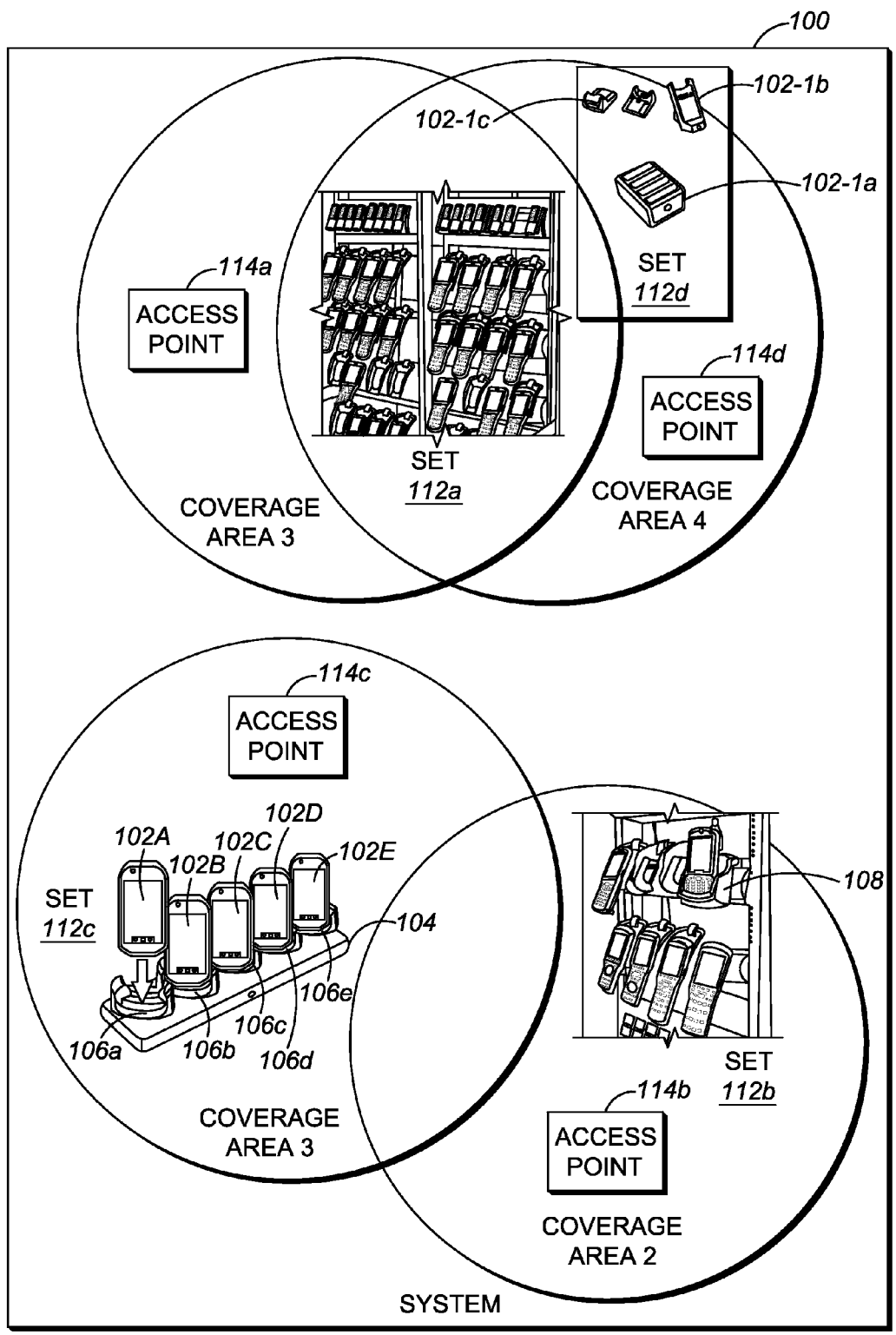
FIG. 1 is a block diagram of a system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to systems and methods for energy management within a group of co-located devices. Each charging member within a group of charging members includes a docking connection. Each charging member also includes a processor for identifying the docking connection. Each charging member further includes a transceiver, responsive to identifying the docking connection, for transmitting information to other charging members in the group and for receiving at least one set of information transmitted from another charging member in the group. Each charging member generates a list using the information transmitted by the charging member and the at least one set of information received by the charging member. Each charging member also includes a ranking component for filtering entries in the list, sorting entries in the list, and ranking entries in the list according to at least one of a predefined selection filter and a predefined ranking filter. Each entry in the list is associated with a charging member with a docking connection and in the group of charging members. Each charging member in the group is configured to determine based on at least one predefined indication filter that an entry in the list that is associated with the charging member is ranked at a predefined position in the list and provide an indication subsequent to the determination. The same list is generated by each charging member in the group using the at least one predefined indication filter, the predefined selection filter and the predefined ranking filter.

FIG. 1 is a block diagram of a system used in accordance with some embodiments. System 100 may include one or more set/groups of charging members (for example, set 112*a*, set 112*b*, set 112*c* and set 112*d*), wherein the charging members may include communication devices 102 as shown, for example, in sets 112*a*, 112*b* and 112*c*, or charging stations 102-1 as shown, for example, in set 112*d*. For ease of illustration, only the communication devices in set 112*c* are label as communication devices 102*a*-102*e*. However, it should be noted that when reference is made to communication device 102, the reference also includes communication devices in sets 112*a* and 112*b*. Communication devices 102 may be radios, for example, portable two-way radios, mobile radios, or other similar portable or mobile computing devices. Charging stations 102-1 may be a multi-slot charging device (for example, charging station 102-1*a*), a single-slot charging device (for example, charging station 102-1*b*) or a single-slot charging device with a spare cradle (for example, charging station 102-1*c*) that is used to charge one or more rechargeable batteries. Each communication device 102 and charging station 102-1 (collectively referred to herein as charging members 102) includes a ranking component (not shown) for ranking one or more lists generated by the charging member using, for example, one or more of a selection filter, a ranking filter and an indication filter.

Non-limiting examples of the selection filter may include one or more of the state of charge of a battery being used by communication device 102 or being charged by charging station 102-1, the state of health of a battery being used by communication device 102 or being charged by charging station 102-1, a specific characteristic of a charging member 102 (for example, charging members with radio frequency identification (RFID) or near field communications (NFC) features), the size/capacity of a battery being used by communication device 102 or being charged by charging station 102-1, the location of charging member 102, and/or the type of charging station (for example, a terminal cradle or battery charger) being used to charge batteries. Non-limiting examples of the ranking filter may include one or more of the state of charge of a battery being used by communication device 102 or being charged by charging station 102-1, the state of health of a battery being used by communication device 102 or being charged by charging station 102-1, a duration since last a calibration, the age of a battery being used by communication device 102 or being charged by charging station 102-1, and the time a battery being used by communication device 102 or being charged by charging station 102-1 spent in a cradle/charger during a present charge cycle. Non-limiting examples of the indication filter may include the best or worst state of charge associated with batteries being used by communication device 102 or being charged by charging station 102-1, a predefined best or worst (for example, the best three) state of charge associated with batteries being used by communication device 102 or being charged by charging station 102-1, the best or worst state of charge associated with batteries being used by a subgroup of communication devices 102 or being charged by a subgroup of charging stations 102-1, and/or at least one battery with a state of charge that is greater than a percentage of the original full capacity of the battery.

To charge one or more batteries on charging stations 102-1, or alternatively to charge one or more batteries within one or more communication devices 102, each battery or device may be docked in individual charging members (for example, charging cradle 108 as shown in set 112*b*) or in a single charging member (for example, charging station 104 as shown in set 112*c*) with multiple charging cradles (for example, charging cradles 106*a*-106*x* as shown in set 112*c*). Non limiting examples of charging configurations may include multi-slot chargers and multi-position cradles for charging multiple batteries or batteries within communication devices, and single-slot chargers and single slot cradles for charging individual batteries or batteries within communication devices.

In accordance with some embodiments, charging members of a set 112 communicate with each other directly via a wired or wireless communication network. It will be appreciated that the communication system, in accordance with the present invention, can be a wireless communication system, a wired communication system, a broadcast communication system, or any other equivalent communication system. For example, the communication system can function utilizing any wireless radio frequency channel, for example, a one or two-way messaging channel, a mobile cellular telephone channel, or a mobile radio channel. Similarly, it will be appreciated that the communication system can function utilizing other types of communication channels such as Institute of Electrical and Electronics Engineers (IEEE) 802.11, IEEE 802.16 and/or Bluetooth channels. Further, it will be appreciated that the communication system can function utilizing a wireline communication channel such as a local area network (LAN) or a wide area network (WAN) or a combination of both. The LAN, for example, can employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication among the devices and/or chargers. The WAN, for example, can use a physical network media such as X.25, Frame Relay, ISDN, Modem dial-up or other media to connect devices or other local area networks. In the following description, the term "communication system" refers to any of the systems mentioned above or an equivalent.

Similarly, it will be appreciated by one of ordinary skill in the art that each of the charging member 102 can be a charger itself or a wireless communication device, a wired communication device, a broadcast communication device, or any other equivalent communication device incorporating a rechargeable battery. For example, the communication device can be a mobile computing device, a mobile cellular telephone, a mobile radio data terminal, a mobile cellular telephone having an attached or integrated data terminal, or a two-way messaging device. Similarly, the communication device can be any other electronic device such as a personal digital assistant or a laptop computer. In the following description, the term "device" refers to any combination of the devices mentioned above or an equivalent.

When charging members 102 communicate with each other, individual charging members may operate in the same coverage area/location or in different coverage areas/locations. For example, charging members 102 in set 112*a* are operating in coverage area 1 and coverage area 4 (i.e., the respective coverage areas of access points 114*a* and 114*d*), the charging members 102 in set 112*b* are operating in coverage area 2 (i.e., the coverage area of access point 114*b*), the charging members 102 in set 112*c* are operating in coverage area 3 (i.e., the coverage area of access point 114*c*) and the charging members 102 in set 112*d* are operating in coverage area 4 (i.e., the coverage area of access point 114*d*).

In accordance with some embodiments, subsequent to a charging member (for example, a communication device 102) being docked in a charging cradle or subsequent to a battery being inserted into a charging member (for example, charging stations 102-1), a processor on the charging member 102 may identify a docking connection between the communication device and the charging cradle or between the battery and the charging station. In response to identifying the docking connection, each charging member 102 may send introductory information with, for example, device information, battery information, and/or location information to introduce that charging member to other charging members 102 on the same network. Each charging member 102 may transmit (broadcast or multicast) its information within the utilized communication system so that any charging member 102 within its transmission range and/or on its network can receive the information. It should be noted that each charging member 102 may also transmit other information to other charging members 102 within its transmission range and/or on its network.

A non-limiting example of the device information transmitted by each charging member 102 may include a unique identifier associated with charging member 102 and/or an address assigned to charging member 102. A non-limiting example of battery information transmitted by each charging member 102 may include a current state of charge or a state of health of the battery being used or charged by the charging member. A non-limiting example of location information transmitted by each charging member 102 may include a location identifier programmed into the charging member, an associated address of each access point detected by the charging member and/or the measured signal strength between the charging member and each detected access point. The measured signal strength included in the location information may be an average of the measured signal strengths over a time period. For example, the measured signal strength sent in a set of information transmitted from device 102*a* may be an average of the measured signal strengths between device 102*a* and access point 114*c* that was recorded by device 102*a* over a few minutes. It should be noted that other device information, battery information and/or location information may be transmitted in the information sent from each device 102.

Subsequent to transmitting the introductory information, while, for example, communication device 102*a* is docked in charging cradle 106*a*, communication device 102*a* may periodically transmit information with the device information, battery information and location information to other charging members in sets 112*a*-112*d* with docking connections. In other words communication device 102*a* may periodically send information to other communication devices 102 that are docked in charging cradles and other charging stations 102-1 that are currently charging batteries. Accordingly, information transmitted from each charging member 102 in one location may include one or more common programmed location information and/or addresses with different signal strengths. Information transmitted from charging members 102 in distinct locations may include distinct programmed location information and/or addresses for one or more access points in each distinct location, wherein the programmed location information and/or the address(es) in a first location may be different from the programmed location information and/or the address(es) in a second location. For example, information transmitted from each communication device in set 112*a* will include the addresses for access points 114*a* and 114*d* and the measured signal strength between each communication device in set 112*a* and access points 114*a* and 114*d*. Similarly, information transmitted from each communication device in set 112*b* will include the address for access point 114*b* and the measured signal strength between each communication device in set 112*b* and access point 114*b*; information transmitted from each communication device in set 112*c* will include the address for access point 114*c* and the measured signal strength between each communication device in set 112*c* and access point 114*c*; and information transmitted from each charging station 102-1 in set 112*d* will include the address for access point 114*d* and the measured signal strength between each charging station 102-1 in set 112*d* and access point 114*d*.

Subsequent to each charging member 102 in sets 112*a*-112*d* having a docking connection, each charging member 102 may receive the information transmitted from other charging members 102 in sets 112*a*, 112*b*, 112*c* and/or 112*d* that also have docking connections. A processor in each charging member 102 in sets 112*a*-112*d* that has a docking connection may use the information generated by the charging member and the information received by the charging member to build a list of charging members with docking connections. The list may include all charging members in a given location (i.e., charging members that detected the same access point(s)) or sub-groups of charging members in the given location. A ranking component in each charging member 102 may defined and characterize locations from which information is received and may apply a label to each location. Consider for example that twenty four communication devices in set 112*a* are docked in charging cradles in the first and fourth locations (i.e., coverage area 1 and coverage area 4), the ranking component in each of the twenty four communication devices in set 112*a* may apply a first location label and/or a fourth location label to the information associated with those communication devices that are determined to be in the first and/or fourth locations (i.e., those communication devices that detected access point 114*a* and 114*d*).

The ranking component in each of the twenty four communication devices in set 112*a* may also group the twenty four communication devices in set 112*a* into sub-groups and label each sub-group. For example, the ranking component in each of the twenty four communication devices in set 112*a* may create four sub-groups for the first location and label each sub-group. Thereafter, when the ranking component in each of the twenty four communication devices in set 112*a* ranks the list(s) with the sub-groups of devices in the first location, the list(s) in each of the twenty four communication devices may include the six devices that are assigned to each sub-group. Accordingly, the ranking components for each of the twenty four communication devices in set 112*a* may rank four distinct lists for the first location, each of which may be associated with a sub-group and include the six communication devices in the sub-group. Alternatively, the ranking components for each of the twenty four communication devices in set 112*a* may rank one list for the first location and identify the sub-groups in the list. It should be noted that this is only an example. Any number of communication devices and/or charging stations may be included in the lists, groups and sub-groups described herein.

The ranking component in each charging member 102 may use one or more predefined selection filter criteria to filter in or out information received from one or more charging members with docking connections. For example, the ranking component in communication device 102*a* may only include, in the list, information received from communication devices with similar hardware configuration as communication device 102*a*. In some embodiments, the ranking component in each charging member 102 may also apply a hardware configuration label to information associated with each charging member; such that information associated with charging members with similar hardware configurations may have the same label and the entries that are associated with the charging members included in the list may be filtered based on the hardware label. In other embodiments, when each charging member 102 generates information, the charging member may apply a hardware configuration label to the generated information. Subsequent to receiving information with a hardware label, the ranking component in each charging member 102 may use the hardware label in the packet to filter the information into or out of the list. In another example, the ranking component in communication device 102*a* may only include, in the list, information received from charging members within the same location as communication device 102*a* (i.e., communication devices that detected the same access point(s) as communication device 102*a*).

Subsequent to filtering the list, the ranking component in each charging member 102 may use one or more predefined ranking filters to sort the list and rank the entries associated with charging members in the list. For example, the ranking component in each charging member 102 may use the predefined ranking filter to sort the list and may use one or more predefined indication filters to, for example, indicate that the charging member whose battery has the highest state of charge and/or best state of health is the first charging member in the list, indicate the charging member with the next highest state of charge or next best state of health is the next charging member in the list, and so on. The ranking component in each charging member 102 may also assign two or more charging members to the same ranking position based on, for example, a ratio associated with the total number of charging members in the list. Consider, for example, that the ranking component in each communication device in set 112a creates a list with twenty four communication devices in set 112a. The ranking component in each communication device in set 112a may divide the group of twenty four communication devices into sub-groups. For example, the ranking component may divide the group of twenty four communication devices into four sub-groups, each with six communication devices. The ranking component may rank a communication device associated with a sub-group and with the highest state of charge and/or best state of health as the first communication device for the sub-group. Therefore, the list for the communication devices in set 112a would include four communication devices that are ranked as the first communication device for each sub-group.

In some embodiments, if when using the ranking criteria to select one charging member for each position in the list, the ranking component in each charging member 102 determines that two or more charging members should occupy the same position in the list, the ranking component may further sort the charging members in the same position in the list based on a predefined sorting criterion. Non-limiting examples of a predefined sorting criterion include the device identifier or the capacity of the battery associated with the charging member. Accordingly, all charging members in sets 112a-112d using the same selection filter, ranking filter and indication filter may generate the same list.

Subsequent to each charging member 102 ranking its list, when a charging member determines that it is associated with a predefined rank in the lists generated by all charging members using the same selection filter, ranking filter, and indication filter, the charging member may provide an indication and/or display the list to a user. For example, if communication device 102e is the highest ranked device in the lists generated by all charging member using the same selection filter, ranking filter, and indication filter, communication device 102e may provide an indication to the user via, for example, a predefined light-emitting diode (LED) blinking pattern. In another example, communication device 102e may have its backlight turned on and the other charging members in sets 112a, 112b 112c and/or 112d with the same list as communication device 102e may have their backlight turned off. In an embodiment, the charging members in a location may include a motion detection sensor and the backlight of a charging member associated with a predefined rank may be turned on, for example, when motion is detected by the motion sensor and an indication is provided to that charging member. In another embodiment, the backlight of the charging member associated with a predefined rank may be turned on, for example, when a button or touch panel is activated on any charging member, with a docking connection, that generated the same list as the charging member in the predefined rank and an indication is provided from the charging member with the activated touch panel or button to the charging member in the predefined rank. Activating the indication on the charging member in the predefined rank via the motion sensor or via an activated button or touch panel of a charging member in a charging cradle is useful in preventing image burn in the charging member associated with a predefined rank.

In an embodiment, the charging members in a location may also include a motion detection sensor and/or a RFID reader configured to read information, for example, from a badge that includes device/usage profile information. The profile information may include a list of device features and/or preferences and ranking criteria. When motion is detected or information is read by the RFID reader, the charging member with the motion detection sensor and/or RFID reader may broadcast an event alert to other charging members within a given location. Subsequent to receiving the event alert, the charging member in a predefined rank may activate its display.

While docked in the charging cradle, to conserve bandwidth, those charging members whose entries are not in a given position/rank in the list may transmit information less frequently than those charging members whose entries are in the given position. After a charging member loses its docking connection (also referred to herein as a charging member with a terminated docking connection), the charging member may transmit a farewell packet so that each charging member may remove the charging member with the terminated docking connection from its list. The charging member with the terminated docking connection may maintain its list and display the list to a user. The user may use the list provided by the charging member with the terminated docking connection to locate another charging member, for example, a charging member in the list with a rank that is lower or higher than the charging member with the terminated docking connection.

In an embodiment, a charging member associated with a predefined rank may be reserved by a user. For example, the user may select and reserve a charging member in a predefined rank before removing the charging member from its charging cradle. Consider for example that the user has removed the first ranked charging member from its docking connection. If the user determines after some time that the first ranked charging member is no longer suitable, the user may send a reservation request from the first ranked charging member to the next ranked charging member in the list. Subsequent to receiving the reservation request, the charging member being reserved (for example, the second ranked charging member) may disable any indication for a predefined time period. In some embodiments, subsequent to receiving the reservation request, the reserved charging member may send out a farewell packet so that the reserved charging member can be removed from the lists generated by other charging members and the next charging member in the list can determine that it is associated with an entry in a predefined position in the list and provide an indication to the user. In other embodiments, the reserved charging member may send out a farewell packet when it is removed from its charging cradle within the predefined period. If the reserved charging member is not removed from its charging cradle within the predefined period, the reserved charging member may reactivate its indication, when such indication is appropriate, or begin transmitting its information.

Figure 2:
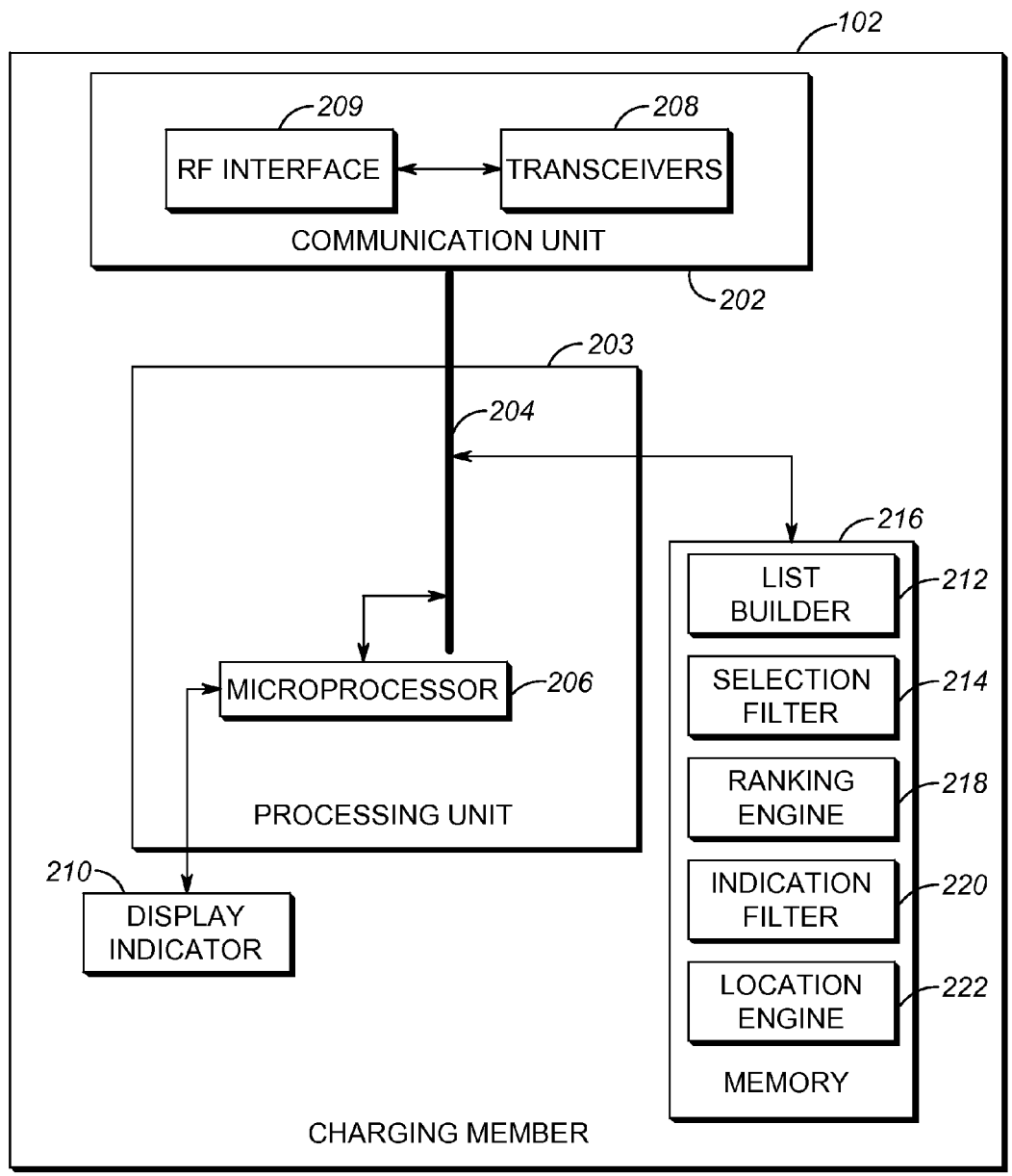
FIG. 2 is a block diagram of a charging member used in accordance with some embodiments.

FIG. 2 is a block diagram of a charging member used in accordance with some embodiments. Charging member 102 includes a communications unit 202 coupled to a common data and address bus 204 of a processing unit 203. Device 102 may also include one or more peripherals, for example, a radio frequency identifier (RFID) reader configured to scan RFID tags or badges. Processing unit 203 may include a microprocessor 206 coupled, by the common data and address bus 204, to a memory 216 and to a display indicator 210.

Communications unit 202 may also include a wired network connection. Communications unit 202 may also include an (radio frequency) RF interface 209 configurable to communicate with network components, and other user equipment within its communication range. Communications unit 202 may include one or more broadband and/or narrowband transceivers 208, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 202 may also include one or more local area network or personal area network transceivers such as wireless local area network transceiver as previously described.

Figure 4:
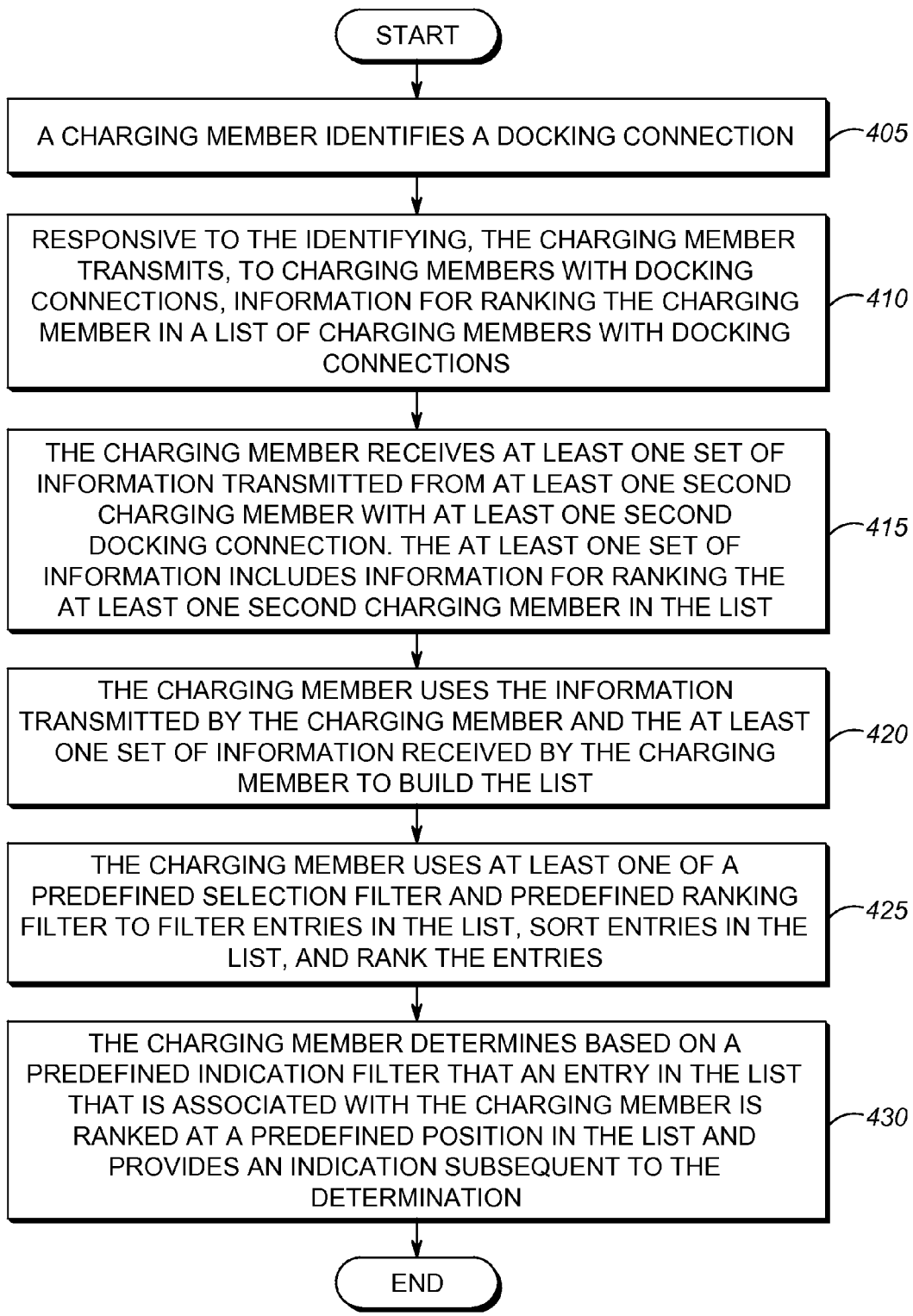
FIG. 4 is a flowchart of a method of energy management executed within each charging member within a group of charging members in accordance with some embodiments.

Memory 216 may store operating code associated with one or more of a list builder 212, a selection filter 214, a ranking engine 218, an indication filter and a location engine 222 and for performing one or more of the steps set forth in FIG. 4.

Figure 3:
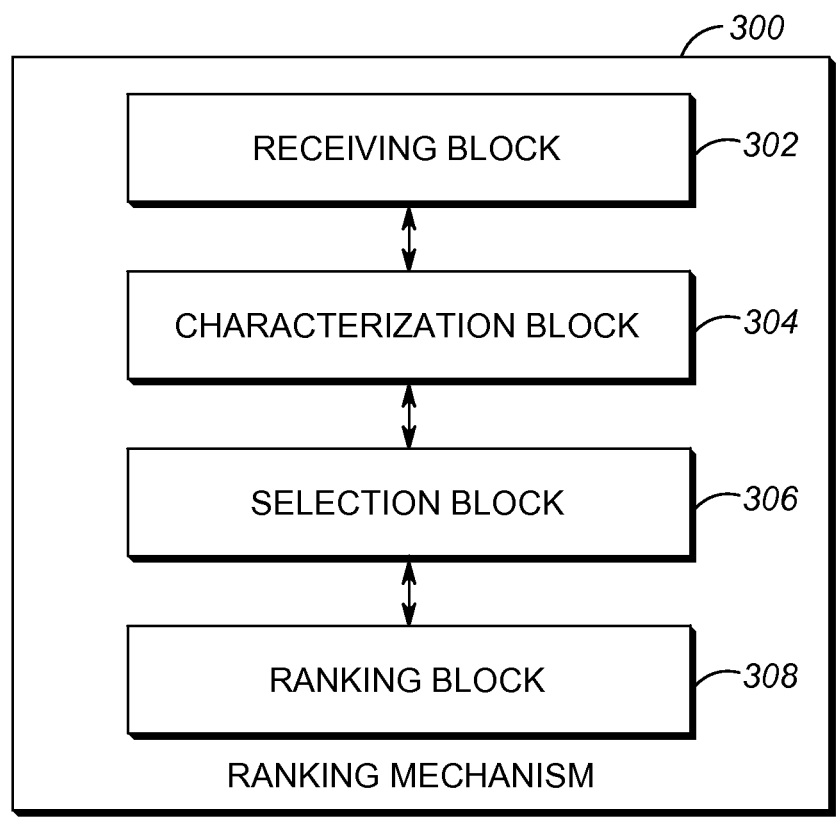
FIG. 3 is a block diagram of a ranking mechanism used in accordance with some embodiments.

FIG. 3 is a block diagram of a ranking mechanism used in accordance with some embodiments. Ranking mechanism 300 (also referred to as ranking component herein) may execute functions provided by one or more of list builder 212, selection filter 214, ranking engine 218, indication filter and location engine 222. For ease of illustration, the functions executed by ranking mechanism 300 are grouped into a receiving block 302, a characterization block 304, a selection block 306 and a ranking block 308. Receiving block 302 obtains information associated with ranking a group of charging members. The information obtained by receiving block 302 may be generated by a charging member on which receiving block 302 is executed and may be information received by the charging member. Characterization block 304 identifies and defines characteristics associated with the obtained information. Characterization block 304 may label the obtained information with identified characteristics. Selection block 306 removes information from or adds information to the list according to a predefined selection criterion. Ranking block 308 sorts/ranks entries in the list according to a predefined ranking criterion and uses a predefined indication filter to indicate when an entry in the list is associated with an indication criterion. Ranking mechanism 300 in each charging member in a group of charging members using the same selection filter, ranking filter and indication filter may generate the same list.

FIG. 4 is a flowchart of a method of energy management executed within each charging member in a group of charging members in accordance with some embodiments. At 405, the charging member identifies a docking connection. At 410, responsive to the identifying, the charging member transmits, to charging members with docking connections, information for ranking the charging member in a list of charging members with docking connections. At 415, the charging member receives at least one set of information transmitted from at least one second charging member with at least one second docking connection. The at least one set of information includes information for ranking the at least one second charging member in the list. At 420, the charging member uses the information transmitted by the charging member and the at least one set of information received by the charging member to build the list. At 425, the charging member uses at least one of a predefined selection filter and predefined ranking filter to filter entries in the list, sort entries in the list, and rank the entries. Each entry in the list is associated with a charging member with a docking connection in the group of charging members. At 430, the charging member determines based on a predefined indication filter that an entry in the list that is associated with the charging member is ranked at a predefined position in the list and provides an indication subsequent to the determination.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
   identifying, by a charging member in a group of charging members with docking connections, one of a docking connection between the charging member and a charging cradle and a docking connection between the charging member and a battery;
   responsive to the identifying, transmitting, by the charging member to other charging members in the group, information for ranking the charging member in a list including entries for one or more charging members in the group of charging members;
   receiving, by the charging member, at least one set of information transmitted from at least one second charging member in the group of charging members, wherein the at least one set of information includes information for ranking the at least one second charging member in the list;
   generating, by the charging member, the list using the information transmitted by the charging member and the at least one set of information received by the charging member;
   using, by the charging member, at least one of a predefined selection filter and a predefined ranking filter to filter entries in the list, sort entries in the list, and rank the entries, wherein each entry in the list is associated with a charging member with a docking connection and in the group of charging members; and
   determining, by the charging member, based on at least one predefined indication filter that an entry in the list that is associated with the charging member is ranked at a predefined position in the list and providing an indication subsequent to the determining.

2. The method of claim 1, wherein the predefined indication filter, the predefined selection filter and the predefined ranking filter includes at least one of a hardware configuration selection criterion, a location selection criterion, and a hardware operation status criterion.

3. The method of claim 1, wherein the list is configured to include one of all charging members in a location and subgroups of charging members in the location.

4. The method of claim 1, further comprising characterizing, by the charging member, at least one of:
   the at least one set of information received by the charging member and labeling the at least one set of information received by the charging member according to a characterization; and
   the information transmitted by the charging member and labeling the information transmitted by the charging member according to the characterization.

5. The method of claim 1, wherein the information transmitted by the charging member includes at least one of device information, battery information and location information.

6. The method of claim 1, wherein the providing comprises providing the indication using one of a predefined blinking pattern and a backlight on the charging member.

7. The method of claim 1, further comprising at least one of:
   detecting motion and providing the indication responsive to detecting the motion; and
   receiving an alert and providing the indication responsive to receiving the alert.

8. The method of claim 1, further comprising maintaining the list such that the list is the same as a list generated by each charging member in the group that used the at least one predefined indication filter, the predefined selection filter and the predefined ranking filter.

9. The method of claim 1, further comprising one of:
   detecting a termination of the docking connection and transmitting a farewell packet to the charging members in the group with docking connections; and
   receiving a farewell packet from a charging member with a terminated docking connection and removing an entry for the charging member associated with the farewell packet from the list.

10. The method of claim 1, further comprising receiving a reservation request and disabling the indication for a predefined period subsequent to receipt of the reservation request.

11. A system, comprising:
    a group charging members each of which includes a docking connection, wherein each charging member in the group comprises:
    a processor for identifying the docking connection;
    a transceiver, responsive to identifying the docking connection, for transmitting information to other charging members in the group and for receiving at least one set of information transmitted from another charging member in the group, wherein each charging member generates a list using the information transmitted by the charging member and the at least one set of information received by the charging member; and
    a ranking component for filtering entries in the list, sorting entries in the list, and ranking entries in the list according to at least one of a predefined selection filter and a predefined ranking filter, wherein each entry in the list is associated with a charging member with a docking connection and in the group of charging members,
    wherein each charging member in the group is configured to determine based on at least one predefined indication filter that an entry in the list that is associated with the charging member is ranked at a predefined position in the list and provide an indication subsequent to the determination, and
    wherein, the list is the same as a list generated by each charging member in the group that used the at least one predefined indication filter, the predefined selection filter and the predefined ranking filter.

12. The system of claim 11, wherein the predefined indication filter, the predefined selection filter and the predefined ranking filter includes at least one of a hardware configuration selection criterion, a location selection criterion, and a hardware operation status criterion.

13. The system of claim 11, wherein the list generated in each charging member in the group is configured to include one of all charging members in a location and sub-groups of charging members in the location.

14. The system of claim 11, wherein each charging member in the group is further configured to at least one of:
- characterize the at least one set of information received by each charging member in the group and label the at least one set of information according to a characterization, and
- characterize the information transmitted by each charging member in the group and label the information transmitted by each charging member in the group according to the characterization.

15. The system of claim 11, wherein the information transmitted by each charging member in the group includes at least one of device information, battery information and location information.

16. The system of claim 11, wherein the display on each charging member in the group is further configured to one of:
- provide the indication using one of a predefined blinking pattern and a backlight on each charging member in the group;
- detect motion and provide the indication responsive to detecting the motion; and
- receive an alert and provide the indication responsive to receiving the alert.

17. The system of claim 11, wherein each charging member in the group is further configured to detect a termination of the docking connection and transmit, via the transceiver, a farewell packet to the other charging members in the group with docking connections.

18. The system of claim 11, wherein each charging member in the group is further configured to receive a farewell packet from a charging member with a terminated docking connection and remove an entry for the charging member associated with the farewell packet from the list.

19. The system of claim 11, wherein each charging member in the group is further configured to receive a reservation request and disable the indication for a predefined period subsequent to receipt of the reservation request.

* * * * *